US009400200B2

(12) United States Patent
Rusch (10) Patent No.: US 9,400,200 B2
(45) Date of Patent: Jul. 26, 2016

(54) DRY PRODUCT DISPENSER WITH REPLACEABLE PORTION CONTROL CONTAINERS AND RATCHETING HANDLE

(71) Applicant: Server Products, Inc., Richfield, WI (US)

(72) Inventor: Gerald A. Rusch, Fond du Lac, WI (US)

(73) Assignee: Server Products, Inc., Richfield, WI (US)

( * ) Notice: Subject to any disclaimer, the term of this patent is extended or adjusted under 35 U.S.C. 154(b) by 58 days.

(21) Appl. No.: 14/225,995

(22) Filed: Mar. 26, 2014

(65) Prior Publication Data

US 2015/0276453 A1 Oct. 1, 2015

(51) Int. Cl.
| | |
|---|---|
| G01F 11/10 | (2006.01) |
| G01F 11/24 | (2006.01) |
| B65D 83/06 | (2006.01) |
| A47G 19/34 | (2006.01) |
| G01F 11/00 | (2006.01) |
| G01F 15/00 | (2006.01) |
| A47F 1/035 | (2006.01) |

(52) U.S. Cl.
CPC ............. *G01F 11/24* (2013.01); *A47G 19/34* (2013.01); *B65D 83/06* (2013.01); *G01F 11/003* (2013.01); *G01F 11/006* (2013.01); *G01F 15/001* (2013.01); *A47F 1/035* (2013.01)

(58) Field of Classification Search
CPC ..... G01F 11/24; G01F 11/003; G01F 11/001; G01F 11/006; B65D 83/06; A47G 19/34; A47F 1/005
USPC ................................................ 222/370, 306
See application file for complete search history.

(56) References Cited

U.S. PATENT DOCUMENTS

| | | | | |
|---|---|---|---|---|
| 1,475,341 | A | * 11/1923 | Sigvort | G01F 11/24 141/360 |
| 1,974,316 | A | 9/1934 | Schoening | |
| 2,920,796 | A | 1/1960 | Field | |
| 4,053,087 | A | 10/1977 | Lack et al. | |

(Continued)

FOREIGN PATENT DOCUMENTS

GB          2 289 671 A          11/1995

OTHER PUBLICATIONS

PCT International Search Report, International Application No. PCT/US2015/022430, mailed Jul. 3, 2015.

*Primary Examiner* — Patrick M Buechner
*Assistant Examiner* — Jeremy W Carroll
(74) *Attorney, Agent, or Firm* — Andrus Intellectual Property Law, LLP (57) ABSTRACT

A dispenser is provided for use in dispensing a selected volume of granulated dry product. The dispenser includes a main body having a discharge opening, an open interior for holding a supply of the granulated product and a discharge spout for dispensing the granulated product. A loading and dispensing member is constructed with spaced apart receiving cavities, and is movably mounted between the discharge opening and the discharge spout. A portion control device defining one selected portion volume is received and retained in each receiving cavity, and is replaceable with a different portion control device having a different portion control volume. A handle is frictionally engaged with the loading and dispensing member to enable rotation of the handle with or relative to the loading and dispensing member to sequentially control loading and dispensing of granulated product from the portion control device.

10 Claims, 8 Drawing Sheets

(56) References Cited

U.S. PATENT DOCUMENTS

| | | | |
|---|---|---|---|
| 4,079,860 A | 3/1978 | Maves | |
| 4,162,751 A | 7/1979 | Hetland et al. | |
| 4,448,331 A | 5/1984 | Millette et al. | |
| 4,511,067 A | 4/1985 | Martin et al. | |
| 4,569,463 A | 2/1986 | Pellegrino | |
| 4,892,233 A * | 1/1990 | Zelickson | 222/226 |
| 4,903,866 A | 2/1990 | Loew | |
| 5,064,104 A * | 11/1991 | Milton | G07F 11/44 222/306 |
| 5,258,090 A * | 11/1993 | Becker | B65C 11/0247 101/288 |
| 5,375,744 A | 12/1994 | Henderson | |
| 6,182,864 B1 | 2/2001 | Elmore | |
| 6,241,123 B1 | 6/2001 | Elmore | |
| 7,731,063 B2 | 6/2010 | Rusch | |
| 8,276,791 B2 | 10/2012 | Huang | |
| 2005/0098586 A1 * | 5/2005 | Jensen | B65G 53/4633 222/367 |
| 2006/0138167 A1 * | 6/2006 | McMahon | A47G 19/183 222/100 |
| 2007/0181604 A1 * | 8/2007 | Rusch | G01F 15/001 222/306 |
| 2011/0062187 A1 | 3/2011 | Johnson et al. | |
| 2011/0062190 A1 | 3/2011 | Johnson et al. | |
| 2012/0292349 A1 | 11/2012 | Zarou | |

* cited by examiner

DRY PRODUCT DISPENSER WITH REPLACEABLE PORTION CONTROL CONTAINERS AND RATCHETING HANDLE

BACKGROUND OF THE INVENTION

The present disclosure relates to a device for dispensing dry granulated products or powders. More specifically, the present disclosure relates to a product dispenser, that dispenses a user-selectable, measured portion of the granulated product.

In many restaurants and food establishments, many frozen food menu items, such as shakes, smoothies and blended ice cream drinks are made with different types of granulated dry products, such as chocolate candies, candy bar pieces and other small granulated products. It is desirable to use the same amount of the granulated product in the creation of the menu item.

Not only is there a need to dispense a known volume of the granulated product, it is also desirable to allow the adjustability of the amount of product dispensed based upon the requirement of the restaurant or food service facility where the dispenser is located.

A dispenser for use in dispensing a selected volume of granulated dry product is disclosed in U.S. Pat. No. 7,731,063, which is herein incorporated by reference. The '063 dispenser includes a main body having, an open interior that receives a supply of granulated product to be dispensed. A loading and dispensing member is positioned to receive the granulated product within a receiving cavity formed as part of the loading and dispensing member. A single portion control member is selectively positioned within the receiving cavity. The position of the portion control member can be adjusted to vary the portion volume received within the receiving cavity between the portion control member and an open end of the receiving cavity. Once the portion volume has been received within the receiving cavity, the loading and dispensing member is moved to the dispensing position to dispense the portion volume. In this manner, a known selected portion volume can be dispensed from the dispenser.

While the dispenser in the '063 patent operates satisfactorily, it is desirable to provide a dispenser which is designed with multiple portion control members that can be selectively replaced to change the desired selected portion volume to be dispensed. It is also desirable to provide a dispenser with a ratcheting handle which enables the portion control members to be indexed simultaneously to loading and dispensing positions.

SUMMARY OF THE INVENTION

The present disclosure relates to a dispenser for loading and dispensing a selected volume of a granulated product. The dispenser includes a main body having a discharge opening, an open interior configured to receive a supply of the granulated product and a discharge spout for dispensing the supply of granulated product therefrom. A loading and dispensing member is constructed with a plurality of spaced apart receiving cavities formed therein, and is movably mounted within the main body between the discharge opening and the discharge spout. A portion control device is received and retained in each of the receiving cavities and is configured to receive the granulated product. Each portion control device defines one selected portion volume and is replaceable with a different portion control device defining another selected portion volume which is different than the one selected portion volume.

The loading and dispensing member is indexable in the main body such that a first portion control device is aligned with the discharge opening for loading the first control device with the granulated product, and simultaneously, a second portion control device is aligned with the discharge spout for dispensing the granulated product from the second portion control device. The main body includes arcuate outer surfaces defining an internal cavity, and the loading and dispensing member has a plurality of spaced apart sectors having arcuate outer surfaces which are slidably engageable with inner walls of the arcuate outer surfaces defining the internal cylinder. The sectors have a generally triangularly shaped cross section. The loading and the dispensing member has an end wall to which the portion control devices are attached. The loading and dispensing member also has a central core through which a center tube passes. The loading and dispensing member further includes a peripheral circular ring constructed with a series of interconnected ramp surfaces, each of the ramp surfaces terminating in a tooth. The dispenser further includes a handle connected to the loading and dispensing member. The handle is movable between a first position and a second position to control loading and dispensing of each portion control device. The handle is frictionally connected to the loading and dispensing members without fasteners. The handle is fictionally engaged with opposite end structure of the loading and dispensing member to enable rotation of the handle with or relative to the loading and dispensing member.

The present disclosure further relates to a dispenser for loading and dispensing a selected volume of granulated product. The dispenser includes a main body having a discharge opening, an open interior configured to receive a supply of the granulated products, a cylindrical internal cavity and a discharge spout for dispensing the supply of granulated product therefrom. A loading and dispensing member is constructed with a plurality of spaced apart receiving cavities formed therein, and is movably mounted within the internal cavity of the body between the discharge opening and the discharge spout. The loading and dispensing member is provided with a series of interconnected ramp surfaces, each ramp surface terminating in a tooth. A portion control container is received and retained in each of the receiving cavities and is configured to receive the granulated product. A handle is frictionally connected with opposite end structure of the loading and dispensing member. The handle is movable from a first position to a second position in one direction to sequentially move the portion control devices in the loading and dispensing member to loading and dispensing positions upon engagement of the handle with one tooth on the loading and dispensing member. The handle is further movable in an opposite direction from the second position to the first position relative to the loading and dispensing member upon engagement of the handle with one of the ramp surfaces and another tooth on an adjacently connected other of the ramp surfaces.

Each portion control container defines one selected portion volume and is replaceable with a different portion control container defining another selected portion volume different from the one selected portion volume. The loading and dispensing member includes an end wall formed with a set of apertures for receiving and retaining engagement members provided on each portion control container. The loading and dispensing member has a central core defined by a group of interconnecting walls. Each portion control container includes a number of upstanding walls and a bottom wall. Each portion control container has a fin which extends between a bottom wall and one of the walls defining the core. The handle has a pair of side arms connected by a crosspiece, the side arms being flexible relative to the crosspiece. The handle is formed with notch structure variously engaged with the ramp surfaces and the teeth on the circular ring. The notch structure and the circular ring are located external to the main body. An engagement finger is joined on an outer surface of the main body, and is variously engaged with the ramp surfaces and the teeth during movement of the handle between the first position and the second position.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
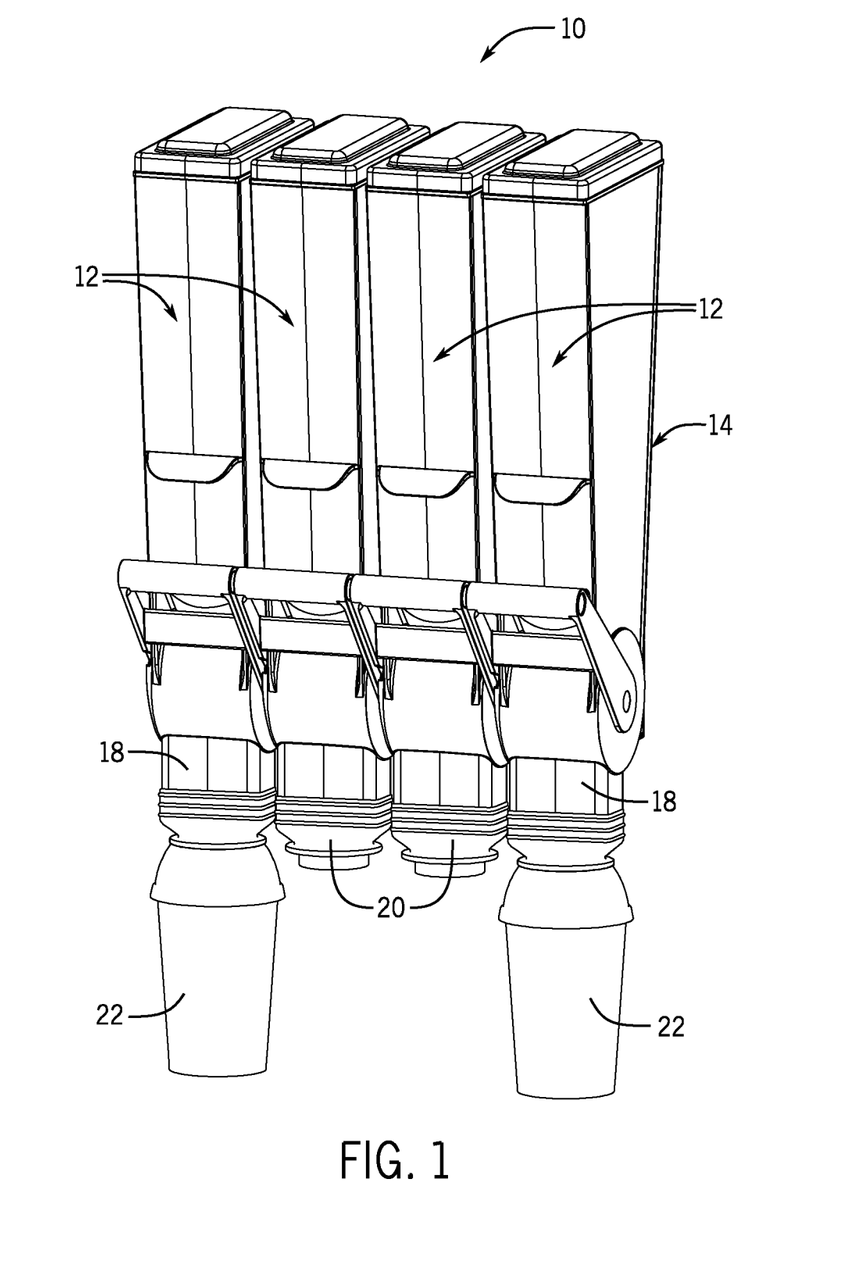
FIG. 1 is a perspective view of a side-by-side arrangement of product dispensers, each being constructed in accordance with the present disclosure.
Figure 2:
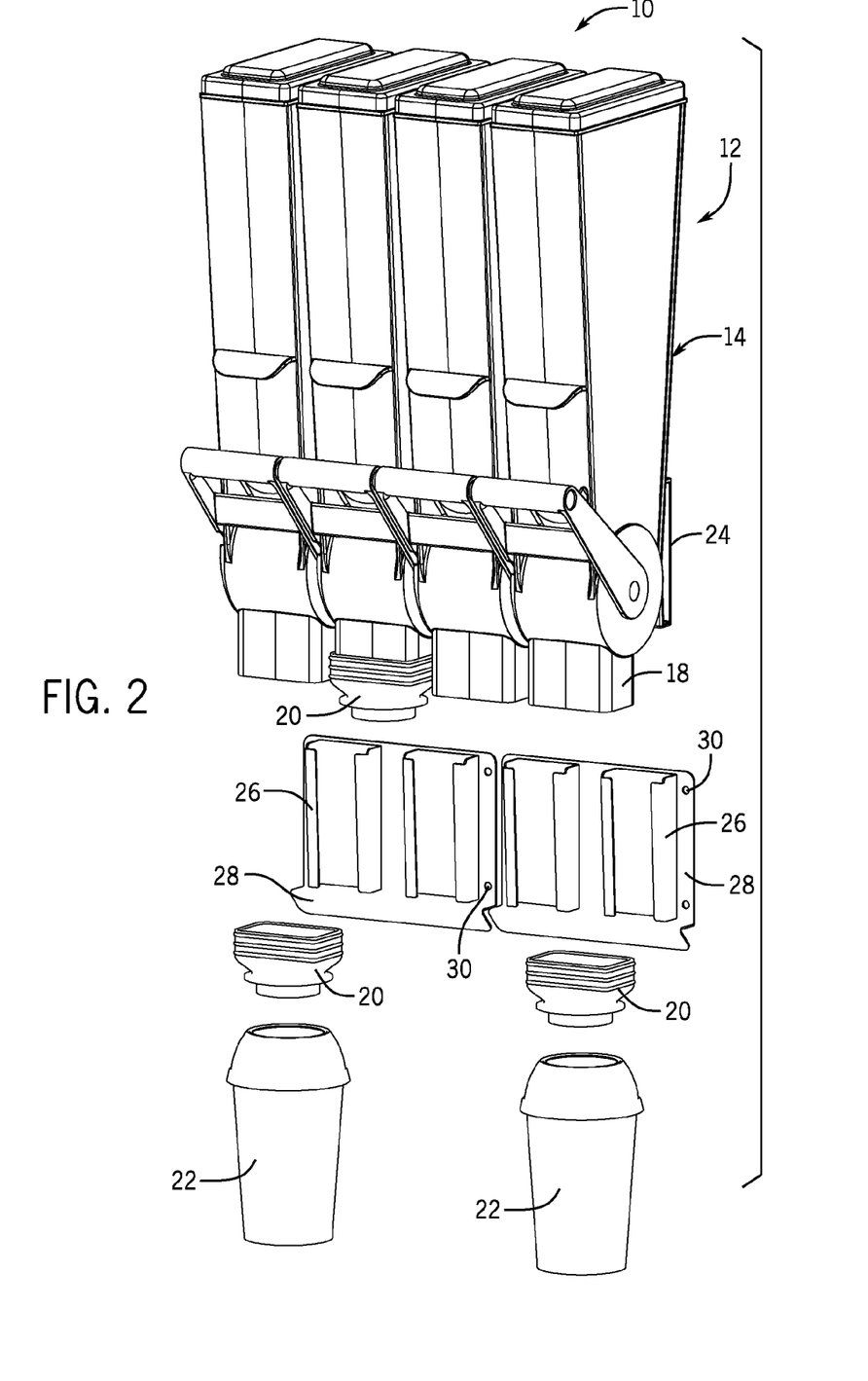
FIG. 2 is an exploded view of certain parts of the product dispenser arrangement shown in FIG. 1.

FIGS. 1 and 2 illustrate a dispensing arrangement comprised of a series of dry product dispensers 12 mounted together in side-by-side relationship. In accordance with the present disclosure, each dispenser 12 is constructed with a main body 14 for storing a supply of granulated product 16 (FIGS. 5 and 6) therein. As will be fully explained hereafter, the granulated products 16 are dispensed through a discharge spout 18 on the lower end of each main body 14. Each discharge spout 18 is connected with an adapter 20 which enables the product 16 to be dispensed into a container 22.

As seen best in FIG. 2, each dispenser 12 is provided with an attachment block 24 which is designed to be fictionally received and retained in a wedge-type fit within a retaining structure 26 included on a mounting plate 28. In the exemplary embodiment, two mounting plates 28 are shown, with each mounting plate 28 being configured with a pair of retaining structures 26. However, it should be understood that the disclosure contemplates different mounting plate configurations with different numbers of retaining structures 26 as desired or necessary. Each mounting plate 28 is normally affixed to a support surface, such as a wall or the like, by passing suitable fasteners through holes 30 in the mounting plate 28.

Referring now to FIGS. 3-6, the main body 14 of each dispenser 12 includes a front wall 32, a rear wall 34 and a pair of sidewalls 36, 38 which together form an open interior 40 and hold the supply of granulated product 16 therein. A lid 42 is mounted to a top of the body 14, and forms a tight fit therewith to limit moisture within the open interior 40, and to enhance freshness of the granulated product 16. As an example, the granulated product 16 can be small candies, crushed candy bars, sugars, artificial flavors or any other type of granulated products that need to be dispensed. Preferably, the body 14 is formed with a molded plastic material, although other materials that can be sanitized are considered to be within the scope of the disclosure.

Figure 3:
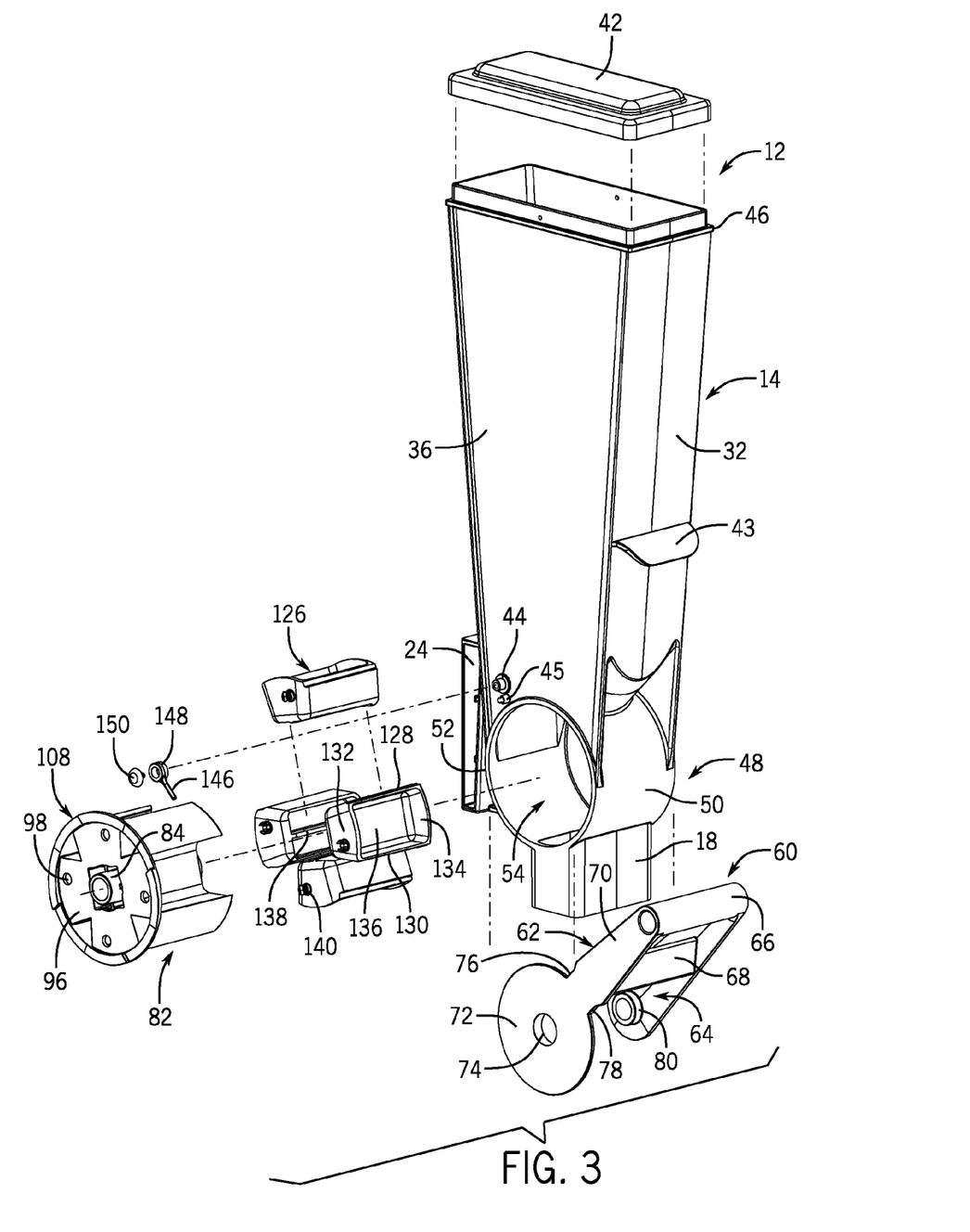
FIG. 3 is an exploded view of a single product dispenser shown in FIG. 1.
Figure 4:
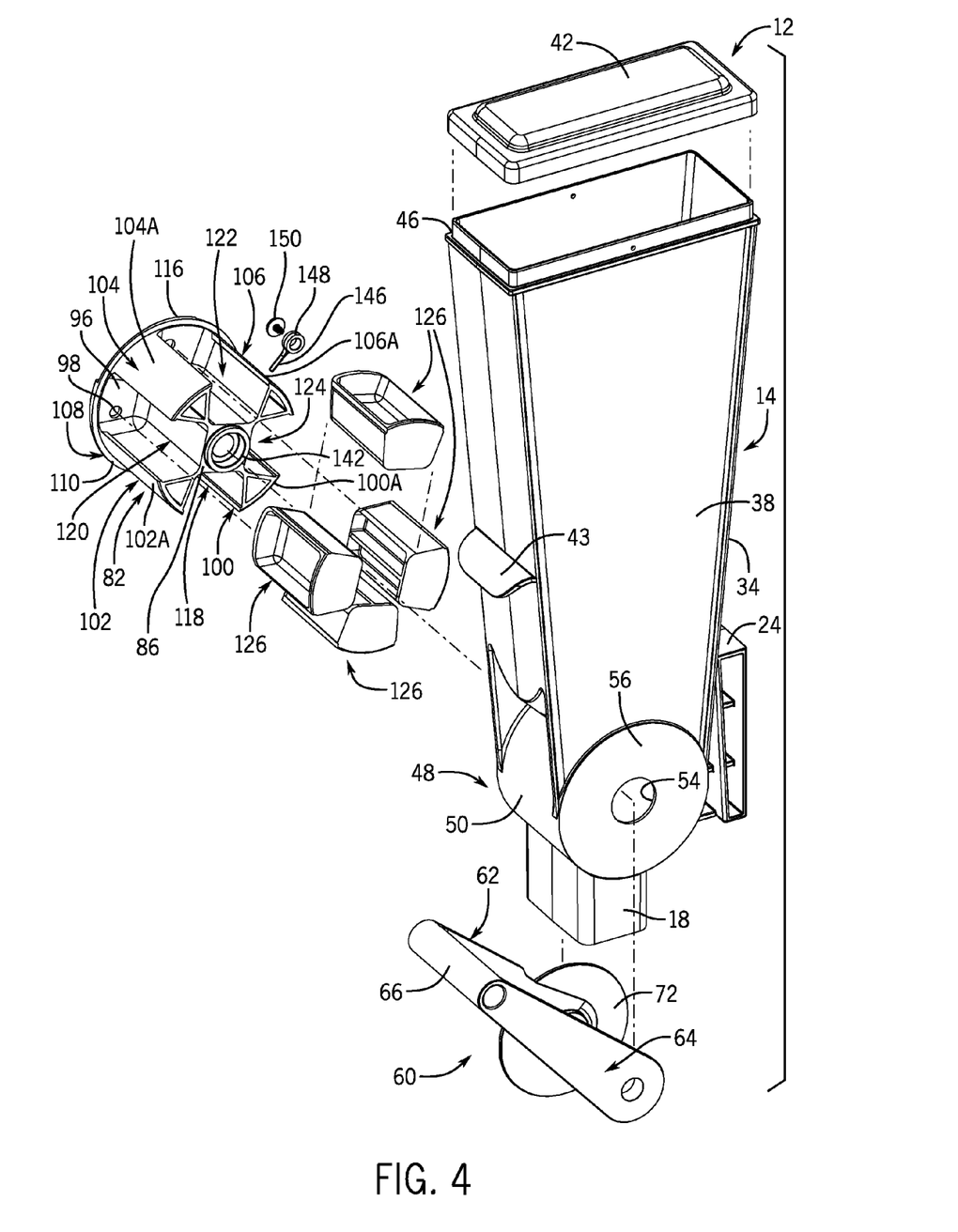
FIG. 4 is another exploded view of the product dispenser shown in FIG. 3.
Figure 5:
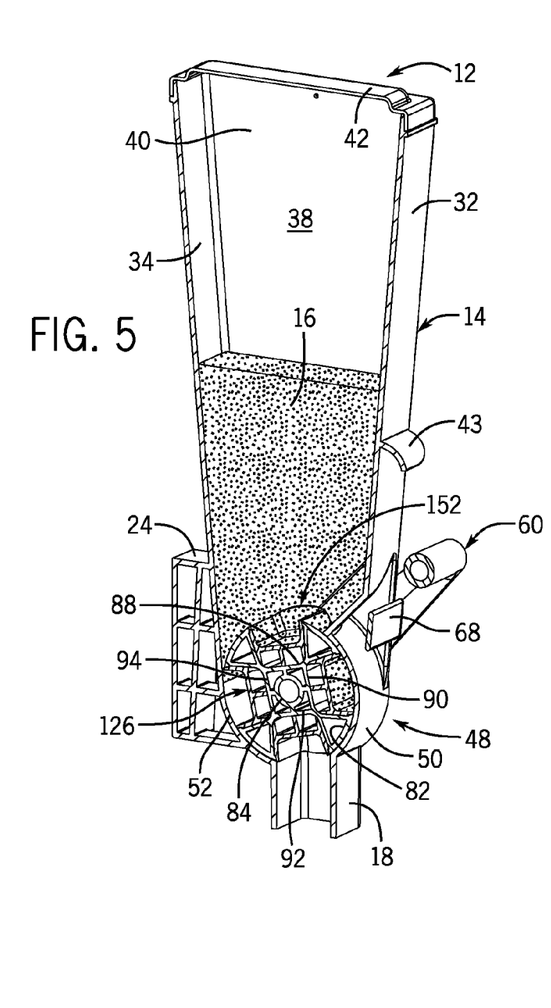
FIG. 5 is a partial sectional view of the product dispenser of FIG. 3 showing the dispensing handle in an upper position.
Figure 6:
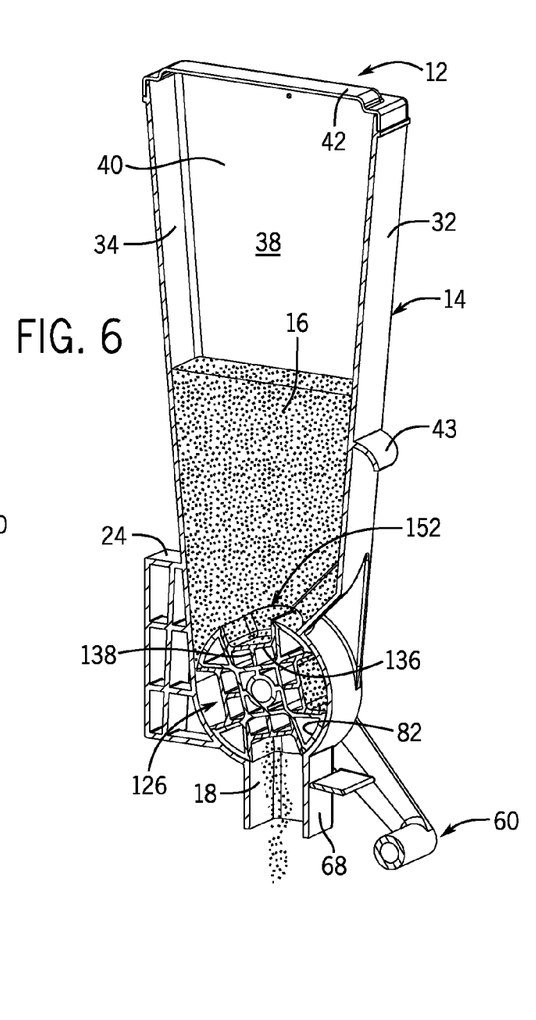
FIG. 6 is a partial sectional view of the product dispenser similar to FIG. 5 showing movement of the dispensing handle from the upper position to a lower position.

The front wall 32 is provided with a lift element 43 which can be used to lift the attachment block 24 and the attached body 14 out of wedging relationship from the mounting plate 28 when desired, such as for cleaning. The sidewall 36 is constructed with a cylindrical protrusion 44 and a projecting stop 45. The front wall 32 and the rear wall 34 converge from an upper end 46 to a lower section 48 of the body 14 having an arcuate front outer surface 50. As best depicted in FIGS. 5 and 6, a lower end of the rear wall 34 defines an arcuate rear outer surface 52 of the lower section 48. The attachment block 24 is typically integrally formed on the lower end of the rear wall 34 and the rear outer surface 52 of the lower section 48. Together, inner walls of the arcuate front outer surface 50 and the arcuate rear outer surface 52 define a cylindrical internal cavity 54. As can be seen in FIG. 3, one side of the internal cavity 54 is open, while an opposite side of the internal cavity 54 has a circular sidewall 56 formed with a central throughhole 58, as depicted in FIG. 4. The lower section 48 is integrally formed with the discharge spout 18 which defines an outlet that directs the granulated product 16 in a controlled manner. The body 14, the discharge spout 18, the attachment block 24 and the lower section 48 are formed integrally preferably of a molded plastic material that can be easily sanitized.

Each dry product dispenser 12 includes a unitary actuation or dispensing handle 60 which is movable through rotation between a first or upper position, such as shown in FIG. 5, and a second or lower position such as shown in FIG. 6. The handle 60 has a pair of spaced apart side arms 62, 64 and a crosspiece 66 joining upper ends of the side arms 62, 64. The side arms 62, 64 are constructed of a resilient material so that they may flex back and forth relative to the crosspiece 66. A spacer 68 extends between the side arms 62, 64 beneath the crosspiece 66. The spacer 68 is designed to contact portions of the body 14 and the discharge spout 18 to aid in supporting movement of the handle 60 between its upper and lower positions. The side arm 62 has an upper portion 70 and a circular lower portion 72 formed with a central hole 74. Inwardly directed notched surfaces 76, 78 are formed between the upper portion 70 and the lower portion 72. A lower end of the side arm 64 is constructed with a circular protrusion 80 designed to be received and retained in the throughhole 58 of the sidewall 56 at the opposite side of the internal cavity 54.

As further seen in FIGS. 3 and 4, the dispenser 12 includes a movable loading and dispensing member 82 which is rotatably received within the internal cavity 54 defined by the lower section 48. The member 82 has a cylindrical-like shape in the illustrated embodiment, and is positioned within the internal cavity 54 by passing the member 82 through the open end of the lower section 48.

Figure 14:
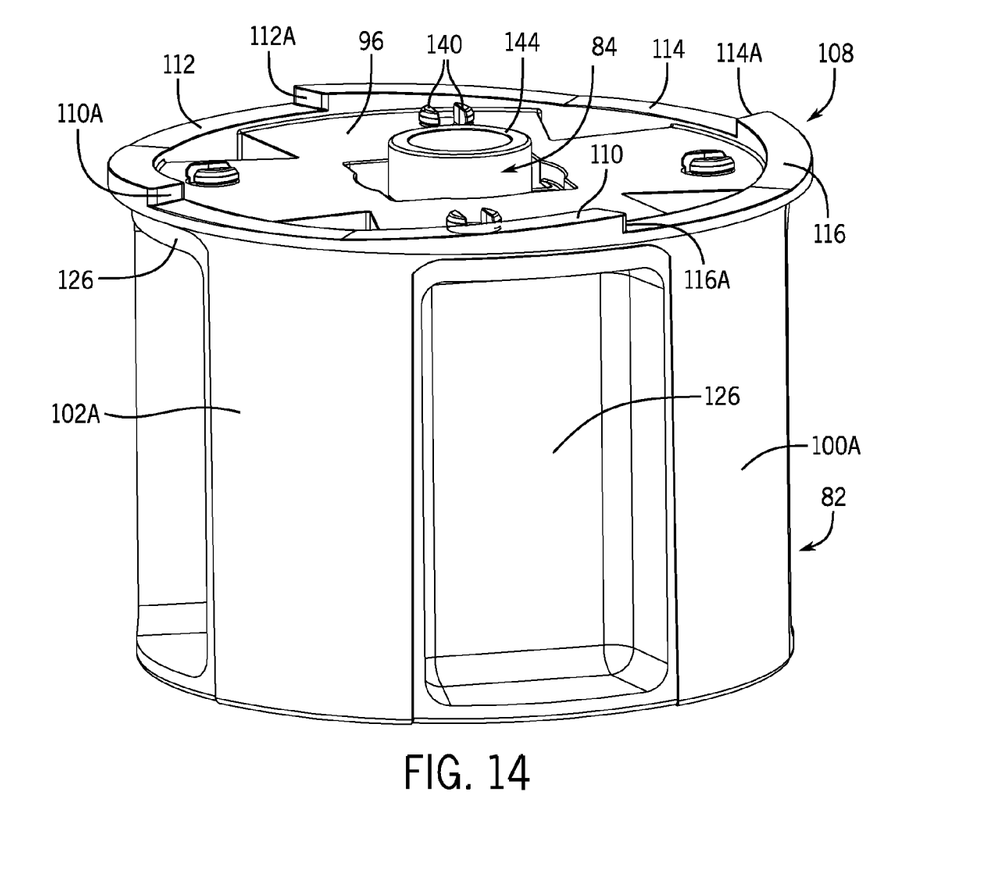
FIG. 14 is a perspective enlarged view of a rotatable loading and dispensing member of the product dispenser.

The loading and dispensing member 82 has a center tube 84 which passes through a central core 86 defined by four interconnecting walls 88, 90, 92 and 94 as best seen in FIG. 5. One side of the central core 86 is connected to an end wall 96 having a series of apertures 98 formed therethrough. Four spaced apart sectors 100, 102, 104, 106 are connected to corners of the central core 86 and extend along a length thereof. In the example shown, each of the sectors 100, 102, 104, 106 is formed with a substantially triangularly-shaped cross section. The sectors 100, 102, 104, 106 include respective spaced apart arcuate outer walls 100a, 102a, 104a, 106a designed to slidably engage the inner walls forming the internal cavity 54. One side of the arcuate walls 100a, 102a, 104a, 106a, is joined to a peripheral circular ring 108 configured to be engaged by a portion of the handle 60. As best seen in FIG. 14, the circular ring 108 is constructed with a series of four interconnected arcuate ramp surfaces 110, 112, 114, 116, each terminating in a respective tooth 110a, 112a, 114a, 116a.

As seen in FIG. 4, the loading and dispensing member 82 is formed with four spaced apart receiving cavities 118, 120, 122, 124 which are defined by the walls 88, 90, 92, 94, the end wall 96 and the sectors 100, 102, 104, 106. Each of the receiving cavities 118, 120, 122, 124 is sized to receive an open top portion control device or container 126 with upstanding walls 128, 130, 132, 134 and a bottom wall 136 having a depending support fin 138 as best seen in FIG. 3. Each fin 138 extends between a bottom wall 136 and one of the core forming walls 88, 90, 92, 94. Each portion control device 126 is identically sized to hold a selected internal volume of the granulated product 16. The walls 132 are provided with flexible engagement members 140 which are designed to be frictionally engaged with walls of the apertures 98 formed therethrough in end will 96 so as to aid in maintaining the portion control devices 126 within the receiving cavities 118, 120, 122, 124.

It should be appreciated that the set of portion control devices or containers 126 having identical selected volumes can be replaced with one or more different sets of portion control devices or containers 126 having different identical selected volumes when it is desired to vary the dispensing portions of the granulated product 16. For example, as seen in FIG. 6, the bottom wall 136 of each portion control device 126 can be variously located relative to the height of the sidewalls 128, 130, 132, 134, such as by altering the height or eliminating the fin 138, to form replacement portion control devices or containers 126 with different identical volumes. Other constructions of the portion control devices or containers 126 are contemplated by this disclosure.

When the loading and dispensing member 82 and portion control devices 126 retained therein are positioned within the lower section 48, an enlarged end 142 (FIG. 4) of the center tube 84 is aligned with the throughhole 58 formed in circular sidewall 56 of the handle, and receives the cylindrical protrusion 80 on handle side arm 64. An opposite end 111 (FIG. 3) of the center tube 84 extends beyond end wall 96, and is received in the hole 74 of the handle circular lower portion 72 which covers the end wall 96 of the member 82. With this construction, the side arms 62, 64 of the handle 60 are frictionally engaged with outer ends of the center tube 84 of member 82 so that the handle 60 can rotate with or relative to the member 82 as will be understood hereafter. At the same time, the notched surface 78 formed on handle side arm 62 is engaged with one of the teeth 110a, 112a, 114a, 116a on the circular ring 108 to allow the handle 60 to better control movement of the member 82 within the lower section 48. Such arrangement enables rotation and a ratcheting movement of the handle 60 so that the member 82 and its portion control devices 126 can be rotatably indexed for sequentially loading and dispensing of granulated product 16 as will be described below. In addition, an engagement finger 146 has a circular portion 148 mounted on the cylindrical protrusion 44 joined to an outer surface of the main body, and is held in place by a retainer 150 so that the engagement finger 146 contacts the stop 45 as well as another one of the teeth 110a, 112a, 114a, 116a on the circular ring 108. The handle 60 can be removed from engagement with the member 82 by flexing the pair of side arms 62, 64 outward to remove the protrusion 80 from the throughhole 58, and to separate the handle lower portion 72 from center tube end 144. The handle 60 is thus frictionally connected to the member 82 without conventional fasteners.

The operation of the dry product dispenser 12 will now be described with beginning reference to FIGS. 5, 7A, 7B and 8. At the outset of this functional description, it should be seen that the circular ring 82 on the loading and dispensing member 82, the notched surface 78 on handle 60 and the engagement finger 146 are all located completely external to the main body 14 so that there is a continuous view of the actuating elements enabling loading and dispensing of the granulated product 16. Initially, the handle 60 is rotated to the upper position shown in FIG. 5 which follows a previous dispensing of granulated product 16 from the lowermost portion control device 126 aligned with the discharge spout 18. In addition, it should be understood that FIG. 5 depicts an example in which a rearward facing portion control device 126 has been previously dispensed, and a forward facing portion control device 126 has been previously filled in accordance with the description below.

Figure 7A:
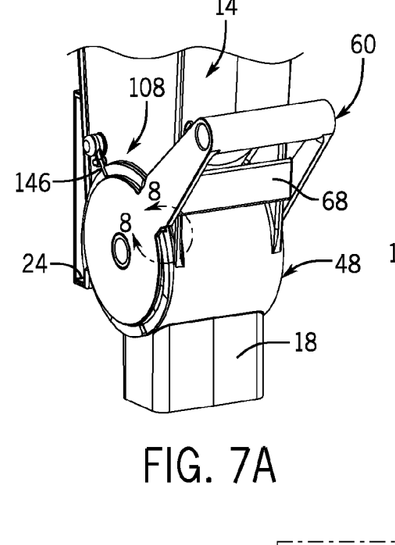
FIGS. 7A and 7B are respective partial perspective and side views of the product dispenser showing the dispensing handle in the upper position.
Figure 7B:
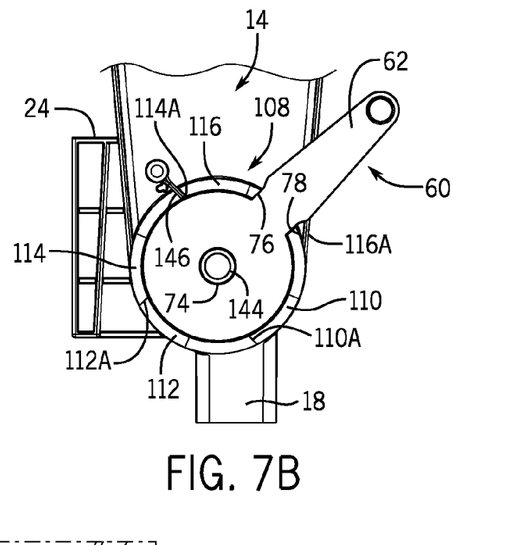
Figure 8:
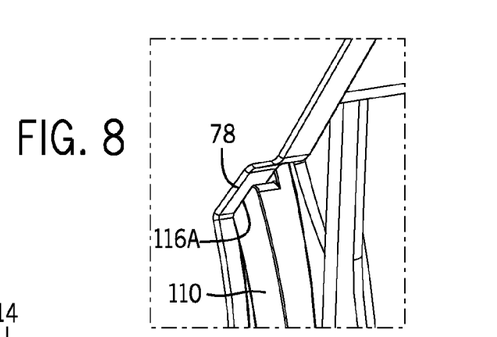
FIG. 8 is a sectional view taken on line 8-8 of FIG. 7A.

With the handle 60 in the position of FIG. 5, the uppermost portion control device 126 has been aligned with a discharge opening 152 located at a lower end of the body 14, and filled with the supply of granulated product 16. Handle spacer 68 contacts a lower portion of the front wall 32 of the body 14 and prevents rotation of the handle 60 in a counterclockwise or rearward direction. As seen in FIGS. 7A, 7B and 8, the notched surface 78 on handle 60 is held in driving engagement with a tooth, such as 116a, on the circular ring 108 of the member 82. Engagement finger 146 is engaged against as different tooth, such as 114a, to prevent counterclockwise rotation of the member 82 and the circular ring 108.

Figure 9A:
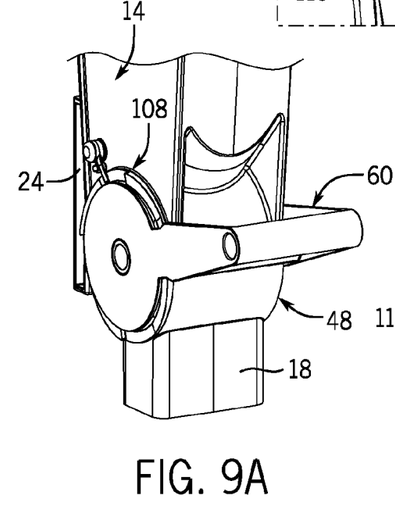
FIGS. 9A and 9B are respective partial perspective and side views of the product dispenser showing movement of the dispensing handle from the upper position towards the lower position.
Figure 9B:
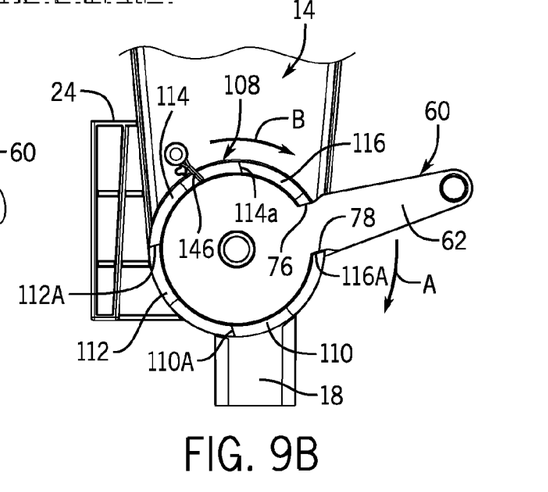

Referring now to FIGS. 9A and 9B, when it is desired to both load and dispense a selected portion of the granulated product 16, the handle 60 is rotated clockwise or forwardly towards the lower position in the direction of arrow A. Because of the driving engagement between the tooth 116a and the notched surface 78 on handle 60, the circular ring 108 and the member 82 attached thereto are simultaneously rotatably driven in the clockwise direction as represented by arrow B. Engagement finger 146 is disengaged from tooth 114a and becomes engaged with the ramp surface 114 as the circular ring 108 is driven in the direction of arrow B. As the circular ring 108 and the member 82 are drivingly rotated, the forward facing portion control device 126 loaded with granulated product 16 as seen in FIG. 5, is also rotated clockwise towards the discharge spout 18. At the same time, the rearwardly facing portion control device 126 which is empty in FIG. 5 rotates in the clockwise direction towards the supply of granulated product 16 in the body 14.

Figure 10A:
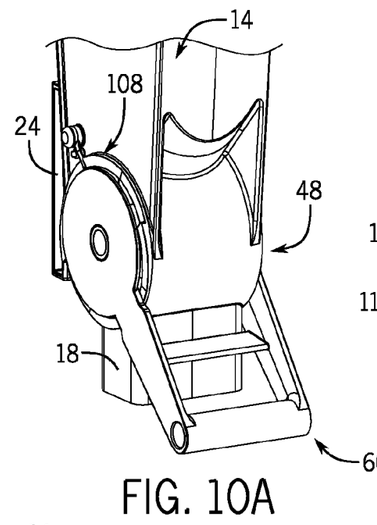
FIGS. 10A and 10B are respective partial perspective and side views of the product dispenser showing the dispensing handle in the lower position.
Figure 10B:
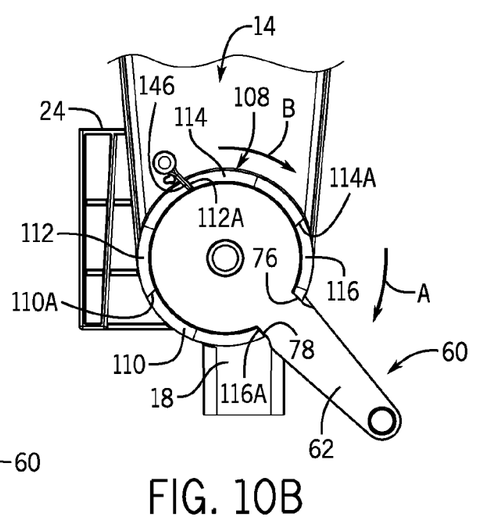

Referring now to FIGS. 6, 10A and 10B, continued rotation of the handle 60 in the direction of arrow A and rotation of the circular ring 108 and member 82 in the direction of arrow B brings the handle 60 to the lower position which is reached when the handle spacer 68 contacts the discharge spout 18 as seen in FIG. 6. At this point, the forward facing portion control device 126 of FIG. 5 which is filled with granulated product 16 has been rotated so that it is in alignment with the discharge spout 18 and gravity aided dispensing of the granulated product 16 takes place as shown in FIG. 6. Concurrently, the rearwardly facing portion control device 126 which is empty in FIG. 5 has been rotated so that it becomes aligned with the discharge opening 152 and filled or loaded with the supply of granulated product 16 in the body 14. That is, rotation of the handle 60 from the upper position to its lower position enables rotatable indexing of the member 82 such that granulated product 16 is both loaded and dispensed in a one-way motion of the handle 60. Engagement finger 146 becomes engaged against tooth 112a.

Figure 11A:
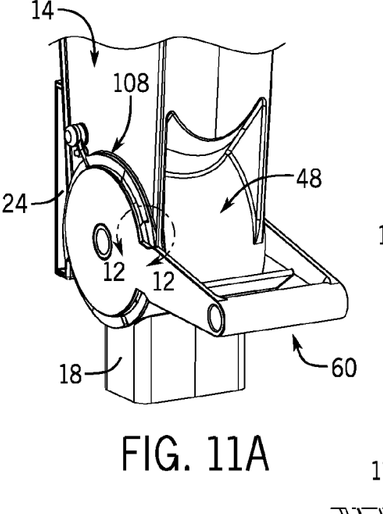
FIGS. 11A and 11B are respective partial perspective and side views of the product dispenser showing movement of the dispensing handle from the lower position back to the upper position.
Figure 11B:
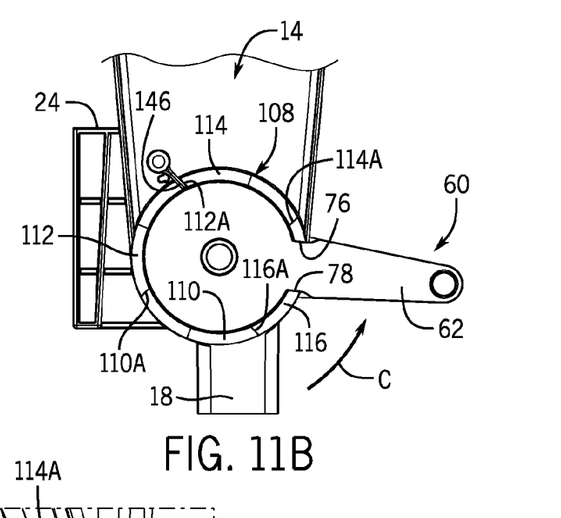
Figure 12:
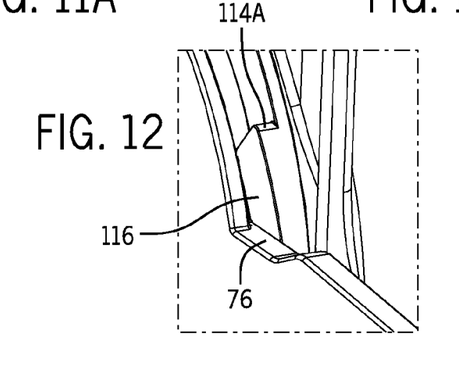
FIG. 12 is a sectional view taken on line 12-12 of FIG. 11A.

Referring now to FIGS. 11A, 11B and 12, following a loading and dispensing operation, the handle 60 is rotated in a reverse or counterclockwise direction in the direction of arrow C towards the upper handle position shown in FIGS. 5, 7A and 7B. During this return movement, the notched surface 78 on handle 60 is separated from the tooth 116a, and the portion of the handle side arm 62 with the notched surfaces 76, 78 travel upwardly along the ramp surface 116. The notched surfaces 76, 78 move in the direction of the tooth 114a FIGS. 13A, 13B). Thus, the handle 60 slides or slips as it is rotated counterclockwise relative to the member 82 and the circular ring 108 which are both held against rotational movement by means of the engagement between the finger 146 and the tooth 112a. Slipping rotation of the handle 60 relative to member 82 and circular ring 108 is further enabled due to the slipping fit or engagement between the protrusion 80 and end 142 of center tube 84 and between the hole 74 on handle side arm 62 and the end 144 of the center tube 84.

Figure 13A:
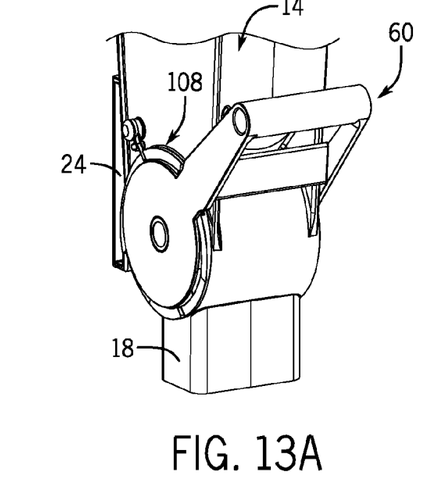
FIGS. 13A and 13B are respective perspective and side views of the product dispenser showing the dispensing handle in the upper position.
Figure 13B:
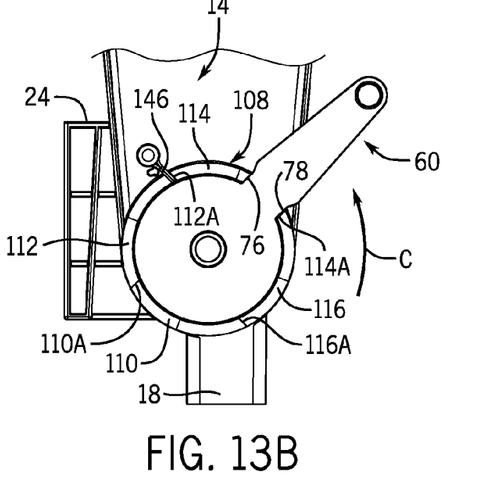

FIGS. 13A and 13B show the engagement of notched surface 78 and the tooth 114a and illustrate handle 60 moved fully to its upper position to complete a dispensing cycle. During this movement, leading notched surface 76 rides over the tooth 114a, and trailing notched surface 78 frills into engagement with the tooth 114a. Thus, it should be appreciated that the dispenser 12 provides a ratcheting handle 60 having a pawl-like notched surface 78 selectively engaged with the teeth 110a, 112a, 114a, 116a on the circular ring 108 to provide one-way rotational movement of the member 82 and the portion control devices 126 for controlled sequential loading and dispensing of granulated product 16.

If it is desired to change the volume of the granulated product 16 to be dispensed, the side arms 62, 64 of handle 60 are flexed outwardly, the member 82 is removed and the portion control devices 126 are replaced with different portion control devices 126 having the desired volume. Loading and dispensing member 82 is then reinserted into the internal cavity 54, and the handle 60 is frictionally reengaged with opposite ends of the member 82 to resume sequential loading and dispensing.

In the present disclosure, certain terms have been used for brevity, clarity, and understanding. No unnecessary limitations are to be inferred therefrom beyond the requirement of the prior art because such terms are used for descriptive purposes and are intended to be broadly construed. The different systems, apparatuses and method steps described herein may be used alone or in combination with other systems, apparatuses and method steps. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. A dispenser for loading and dispensing a selected volume of granulated product comprising:
    a main body having a discharge opening, an open interior configured to receive a supply of the granulated product, a cylindrical internal cavity and a discharge spout for dispensing the supply of granulated product therefrom;
    a loading and dispensing member constructed with a plurality of spaced apart receiving cavities formed therein, and movably mounted within the internal cavity of the body between the discharge opening and the discharge spout, the loading and dispensing member being provided on an outer periphery of end structure thereof with a circular ring formed with a series of interconnected ramp surfaces, each ramp surface terminating in a tooth;
    a portion control container received and retained in each of the receiving cavities and configured to receive the granulated product; and
    a handle frictionally connected with the opposite end structure of the loading and dispensing member, the handle being movable from a first position to a second position in one direction to sequentially move the portion control devices in the loading and dispensing member to loading and dispensing positions upon engagement of the handle with one tooth on the loading and dispensing member, and the handle being movable in an opposite direction from the second position to the first position relative to the loading and dispensing member upon engagement of the handle with one of the ramp surfaces and another tooth on an adjacently connected other of the ramp surfaces.

2. The dispenser of claim 1, wherein each portion control container defines one selected portion volume and is replaceable with a different portion control container defining another selected portion control different from the one selected portion volume.

3. The dispenser of claim 1, wherein the loading and dispensing member includes an end wall formed with a set of apertures for receiving and retaining engagement members provided on each portion control container.

4. The dispenser of claim 1, wherein the loading and dispensing member has a central core defined by a group of interconnecting walls.

5. The dispenser of claim 4, wherein each portion control container includes a number of upstanding walls and a bottom wall.

6. The dispenser of claim 5, wherein each portion control container has a fin which extends between the bottom wall and one of the walls defining the core.

7. The dispenser of claim 1, wherein the handle has a pair of side arms connected by a crosspiece, the side arms being flexible relative to the crosspiece.

8. The dispenser of claim 1, wherein the handle is formed with notch structure configured to engage the ramp surfaces and the teeth on the circular ring.

9. The dispenser of claim 8, wherein the notch structure and the circular ring are located external to the main body.

10. The dispenser of claim 1, wherein an engagement finger is joined on an outer surface of the main body, and is configured to engage the ramp surfaces and the teeth during movement of the handle between the first position and the second position.

* * * * *